July 9, 1963

W. KRASNAHIRA 3,097,352

APPARATUS FOR DETECTING ENGINE FAILURE

Filed April 28, 1961

INVENTOR.
WILLIAM KRASNAHIRA
BY John P. Curran
Arthur N. Collins
ATTORNEYS

United States Patent Office 3,097,352
Patented July 9, 1963

3,097,352
APPARATUS FOR DETECTING ENGINE FAILURE
William Krasnahira, 5217A Spruce St.,
Philadelphia 29, Pa.
Filed Apr. 28, 1961, Ser. No. 115,279
1 Claim. (Cl. 340—236)
(Granted under Title 35, U.S. Code (1952), sec. 266)

The invention described herein may be manufactured and used by or for the Government of the United States of America for governmental purposes without the payment of any royalties thereon or therefor.

This invention relates to a device for indicating the presence of foreign substances in a fluid and more particularly, the invention is more concerned with use in a system for detecting and removing undesired impurities or materials from a lubricating fluid circulating throughout a pipeline.

Heretofore, it has been the practice to test for failure of the component parts of test engines by positioning a magnetic detector in a suitable place inside of the engine where sediment would gradually deposit and refuse collect. This detector incorporated the use of magnets to attract metallic particles, which had been deposited from the lubricant as it circulated throughout the engine. The magnets constituted the terminals of an electric circuit employed for operating a suitable signaling apparatus. The metal particles upon being drawn to the magnets closed a circuit and thereby caused the signaling apparatus to be activated. In this manner, it was possible to detect the presence of particles in the lubricant which had chipped or broken away from parts of the engine.

However, in an effort to reduce the weight of the modern turbo engines, many component parts are now made from alloys such as duraluminum and copper-bronze alloys which are nonmagnetic. Consequently, it is not possible to detect the failure in engines made from these materials with this type of apparatus.

Therefore, an object of the invention is to provide an improved detecting device, with which it will be possible to detect the presence of metallic flakes or chips carried by a lubricant whether they are magnetic or not, with which it will be possible to easily collect and remove these chips from the lubricant in order to analyze their composition.

Another object of the invention is to provide a detector which is simple and economical in construction, which may be easily placed in and removed from a pipe line and which is adaptable to meet the requirements of various installations.

Various other objects and advantages will be apparent from the following description of one embodiment of the invention, and the novel features will be particularly pointed out hereinafter in connection with the appended claim.

Figures 1, 2:
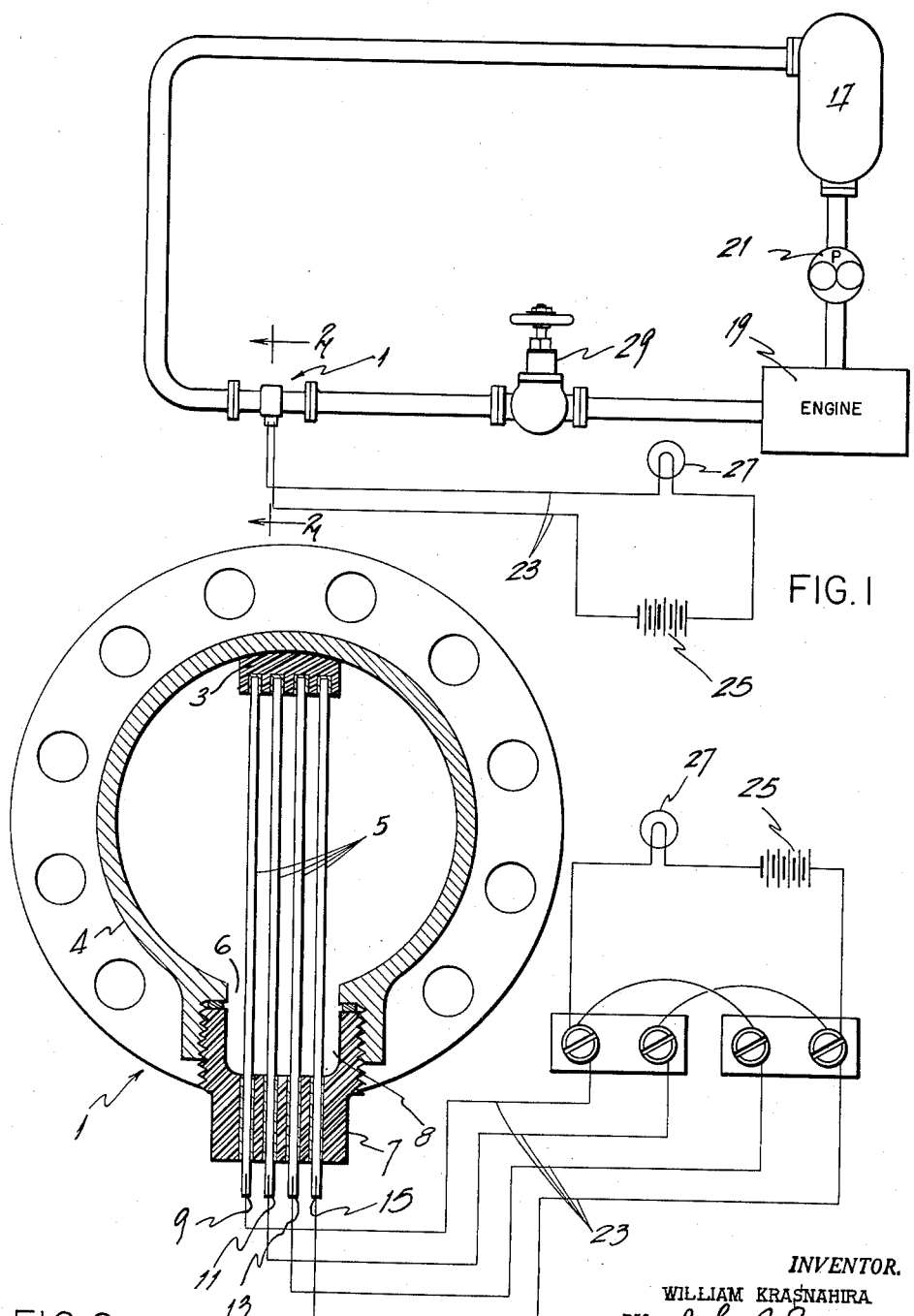
FIG. 1 shows an environmental use of the improved detector described in the subject application.
FIG. 2 is a transverse, sectional elevation of the detector, the section being taken approximately along line 2—2 of FIG. 1.

In the illustrated embodiment of the invention, the detector 1 comprises a body 3 preferably made of insulating material such as plastic or the like and being located inside a pipe 4. Body 3 is smaller than the opening 6 in the pipe 4 so that the detector 1 may be removed from the inside of the pipe. The body carries a group of wires 5 in juxtaposition to each other thereby forming a grid, the ends of the wires inside the pipe are suitably imbedded in the body 3 and the outer ends of the wires are led through a hollow plug 7. The wires are set approximately 0.01" apart which is far enough to prevent them from making contact with one another and still close enough to provide a filtering action for the metal splinters or chips carried by a lubricant which is caused to circulate in the pipe 4. The ends of the wires are connected into a circuit at terminals 9, 11, 13 and 15, respectively.

The plug 7 is suitably threaded on its exterior surfaces whereby it may be adjusted so that the body 3 is properly positioned inside of the pipe 4. The plug contains a pocket 8 which acts as a trap for the metal particles striking the grid 5.

Referring to FIG. 1, it is the practice to cause a lubricant contained in the reservoir 17 while the engine is in operation to circulate under a pressure high enough to force the lubricant to all surfaces of the engine 19 which requires lubrication, this being accomplished by a suitable pump 21. The detector 1 being connected into the lubricating system, it follows that the lubricant is supplied to and is caused to flow over the grid 5. Any metal chips contained in the lubricant are thereby caused to strike the oppositely charged wires of the grid 5 and thereby make contact so that current is caused to flow through the circuit 23 which comprises a source of power 25 and an electrical indicator such as a lamp or the like 27. Lubricating oil, when uncontaminated, is an extremely poor conductor of electricity even when high tension current is employed. Hence, if there is no foreign substances contained in the lubricant, the lamp 27 will remain unenergized. However, during the operation of the engine, assuming the lubricant contains no undesirable constituents at the outset, there will be a gradual accumulation of foreign substances such as, for example, carbon in granular form, and metallic particles which shift away from the component parts of the engine through which the oil is being caused to circulate, all of which have a considerably higher conductivity than the lubricant in its uncontaminated state. These various constituents become a part of the circulating body of liquid and pass over the grid 5 which reduces the resistance of the air gap between the wires and hence establishes a circuit to the lamp 27 causing it to light up indicating the presence of the foreign matter from the engine. The valve 29 enables the operator to shut down the circuit so that the detector 1 may be removed from the pipe. This operation can be easily accomplished by merely unscrewing the plug 7 from the pipe. The pocket 8 collects the metal chips and a qualitative examination is made upon them to determine their source. This enables a determination to be made as to which part of the engine under test is showing failure.

It will be understood that various changes in the details, materials and arrangements of parts which have been herein described and illustrated in order to explain the nature of the invention, may be made by those skilled in the art within the principle and scope of the invention as expressed in the appended claim.

I claim:

A system for detecting the presence of minute electrically conductive impurities contained in a fluid which is flowing through a pipeline without interfering with the rate of fluid flow through the pipeline comprising in combination:

(a) an insulating body;
(b) a threaded insulating plug, said plug being spaced from said body;
(c) a plurality of wires embedded in said body and plug and extending through said plug to form terminals, said wires being parallel in a plane to form a grid;
(d) a pipe, having a threaded opening, said threaded opening mating said threaded plug for positioning said grid within said pipe and closing said pipe;
(e) circuit means connected to said terminals;
(f) a power source;
(g) a lamp connected in series with said power source and said grid by said circuit means whereby any minute electrical conductive impurities present in the fluid will strike the grid thereby closing the circuit and indicating their presence.

References Cited in the file of this patent

UNITED STATES PATENTS

| | | |
|---|---|---|
| 2,252,222 | Os | Aug. 12, 1944 |
| 2,716,165 | Pfitzner | Aug. 23, 1955 |